United States Patent [19]

Kajii et al.

[11] Patent Number: 5,078,776
[45] Date of Patent: Jan. 7, 1992

[54] AIR BED CONVEYING SYSTEM

[75] Inventors: Masuhide Kajii; Yoshihiko Hayashi, both of Osaka, Japan

[73] Assignee: Nippon Sheet Glass Co., Ltd., Osaka, Japan

[21] Appl. No.: 577,545

[22] Filed: Sep. 5, 1990

[30] Foreign Application Priority Data

Sep. 5, 1989 [JP] Japan ................... 1-230239

[51] Int. Cl.$^5$ .............................................. C03B 35/24
[52] U.S. Cl. ................... 65/182.2; 65/273; 65/349; 65/374.13; 406/88; 414/676
[58] Field of Search ................. 65/182.2, 25.2, 25.4, 65/348, 349, 273, 374.13; 406/88; 414/676

[56] References Cited

U.S. PATENT DOCUMENTS 4,664,692  5/1987  Simomura et al. .............. 65/182.2
4,732,513  3/1988  Lenhart .............................. 406/88

FOREIGN PATENT DOCUMENTS 47-2110  1/1972  Japan .

Primary Examiner—Joye I. Woodard
Attorney, Agent, or Firm—Dickstein, Shapiro & Morin

[57] ABSTRACT

An air bed conveying system conveys a workpiece while the workpiece is being floated by air under pressure which is ejected from a plurality of air ejection holes defined in air bed blocks that are supported on respective support blocks. Each of the support blocks is of an integral box-shaped configuration and made of a quartz material having a low thermal expansion coefficient. A plurality of vertical position adjusting mechanisms are disposed underneath each of the support blocks, for adjusting the support block in vertical position.

4 Claims, 5 Drawing Sheets

5,078,776

AIR BED CONVEYING SYSTEM

BACKGROUND OF THE INVENTION

1. Field of the Invention

The present invention relates to an air bed conveying system for conveying workpieces such as sheet glass or the like in a floating condition within a heating furnace.

2. Description of the Relevant Art

Curved tempered sheet glass having a single curvature such as automobile side window glass, for example, is produced by floating-type curved sheet glass manufacturing apparatus which are high in productivity. Sheet glass which is produced by such an apparatus is conveyed with its lower surface held out of contact with the conveying mechanism. One conveying system for conveying sheet glass out of contact therewith is an air bed conveying system disclosed in Japanese Patent Publication No. 47(1972)-2110.

As shown in FIG. 10 of the accompanying drawings, a general air bed conveying system, which is not particularly disclosed in the above publication, includes an air bed 200 comprising a plurality of plate-like supports 202 set as boxes on a refractory furnace floor 201, and a plurality of bed blocks 203 placed on the upper edges of the supports 202. Each of the bed blocks 203 has a number of air ejection holes 203a defined therein all over its surface. The supports 202 and the bed blocks 203 jointly define a number of chambers which are supplied with hot air under pressure through ducts 204. The hot air supplied under pressure to the chambers is then ejected out through the air ejection holes 203.

Since the plate-like supports 202 are simply set on the furnace floor 201, the upper edges of the supports 202 for each of the bed blocks 203 may not lie flush with each other, preventing the bed blocks 203 from being placed hermetically on the supports 202. Therefore, the hot air kept under pressure in the chambers may leak out of the chambers through gaps that may exist between the supports 202 and the bed blocks 203, or may be ejected under irregular pressures from the air ejection holes 203. When such undesirable conditions occur, the sheet glass is not well floated over the air bed 200 or is not stably conveyed thereby. Another problem is that adjacent bed blocks 203 may not be vertically aligned with each other and hence may be vertically staggered with respect to each other.

The present invention has been made in an effort to effectively solve the problems of the conventional air bed conveying system.

SUMMARY OF THE INVENTION

It is an object of the present invention to provide an air bed conveying system which includes a plurality of bed blocks each placed sufficiently hermetically on a support, and are vertically aligned with adjacent bed blocks, so that the air bed conveying system can readily float and stably convey a workpiece, such as sheet glass.

To accomplish the above object, there is provided in accordance with the present invention an air bed conveying system comprising a support block, an air bed block supported on the support block and having a plurality of air ejection holes defined therein. The support block and the air bed block jointly define an air chamber for ejecting supplied air under pressure through the air ejection holes to float a workpiece. The support block is of an integral box-shaped configuration and made of a quartz material having a low thermal expansion coefficient. A plurality of vertical position adjusting mechanisms are disposed underneath the support block, for adjusting the support block in vertical position.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
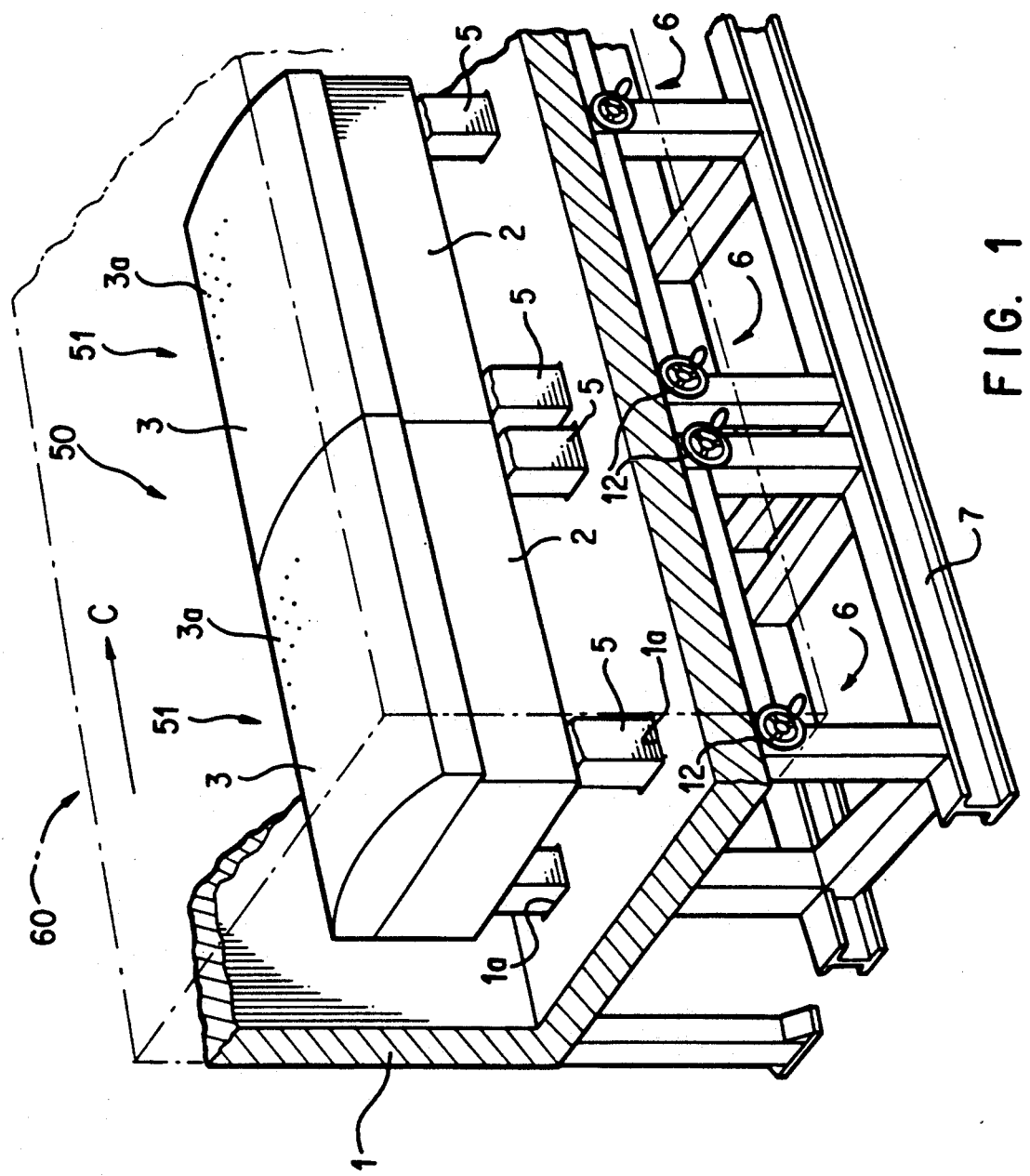
FIG. 1 is a fragmentary perspective view of an air bed conveying system according to a first embodiment of the present invention.
Figure 3:
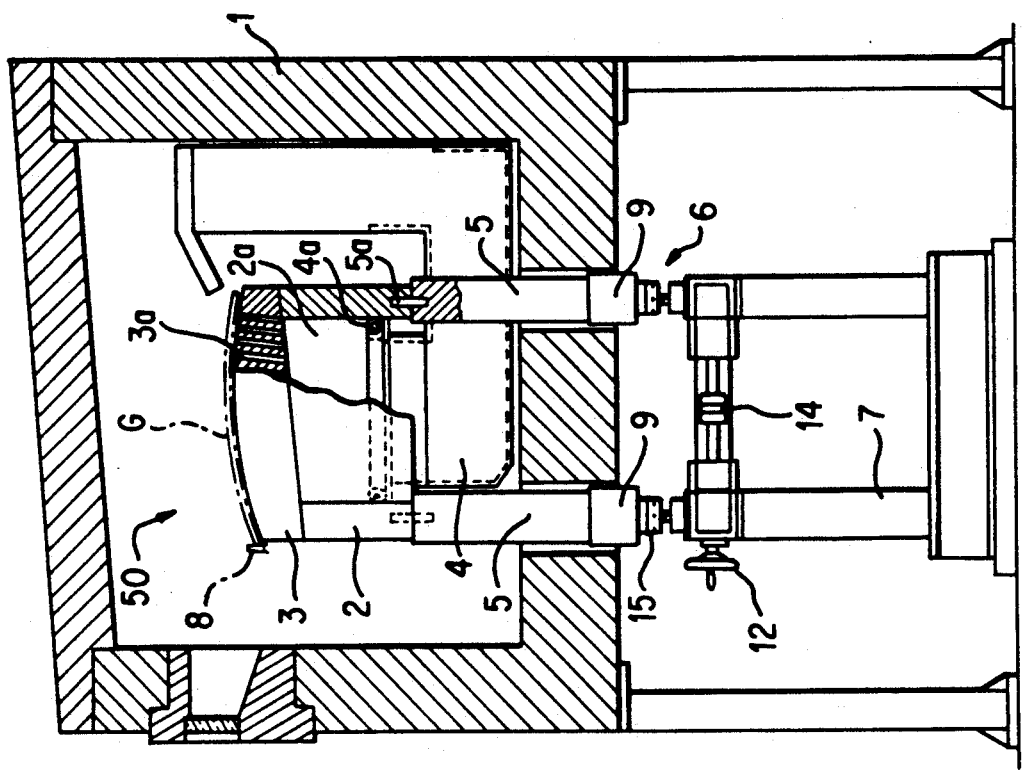
FIG. 3 is a cross-sectional view taken along line III—III of FIG. 2.
Figure 2:
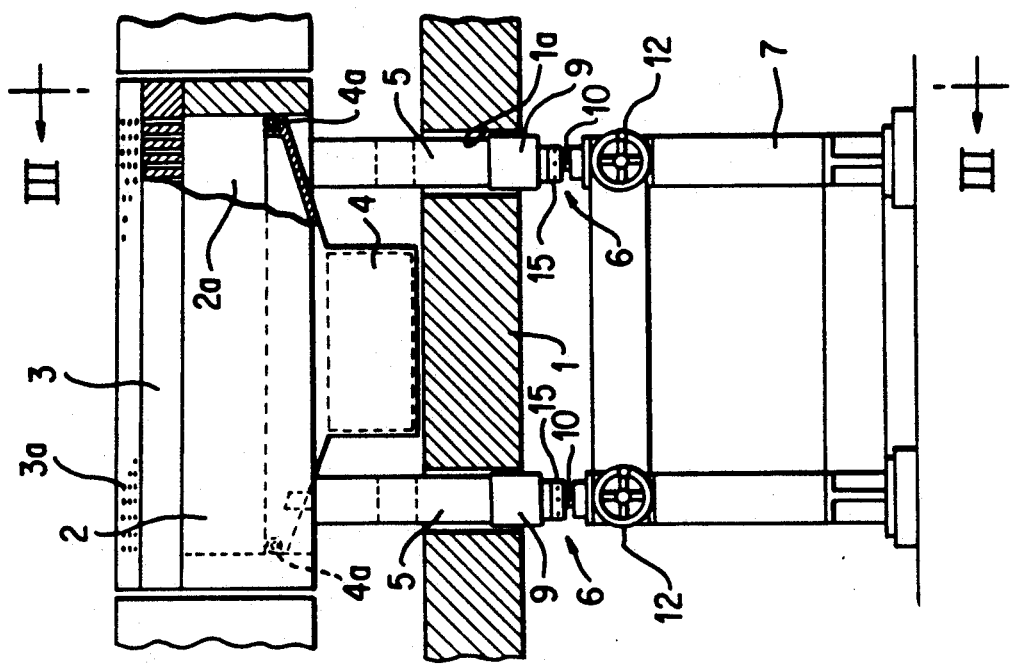
FIG. 2 is a fragmentary side elevational view, partly in cross section, of an air block of the air bed conveying system shown in FIG. 1.

FIGS. 1 through 3 show an air bed conveying system 50 according to a first embodiment of the present invention. The air bed conveying system 50 is disposed in a heating furnace 1 of a curved sheet glass manufacturing apparatus 60. Sheet glass G (FIG. 3) is conveyed in the direction indicated by the arrow C in FIG. 1 by the air bed conveying system 50. The air bed conveying system 50 comprises a plurality of box-shaped support blocks 2 (only two shown) arrayed along the conveying direction C, and a plurality of air bed blocks 3 placed respectively on the support blocks 2 and each having a number of air ejection holes 3a defined all over the surface of each air bed block 3. Each of the support blocks 2 and a corresponding air bed block 3 combined therewith jointly define an air chamber 2a (FIG. 3) therebetween. The support blocks 2 are fitted over the upper openings of respective hot air supply ducts 4 which are each, in turn, connected to a source of hot air (not shown) and are each fixed to the heating furnace 1, with annular seals 4a are interposed between the support blocks 2 and the respective ducts 4. The ducts 4 have respective air inlet holes (not shown) opening in the heating furnace 1 for circulating hot air which is ejected from the air ejection holes 3a. Therefore, any heat loss in the heating furnace 1 is minimized.

Each of the support blocks 2 has each side supported on the upper ends of two vertical legs 5 that are spaced from each other along the conveying direction C. Therefore, each of the support blocks 2 is supported by a total of four vertical legs 5. The support block 2 and the legs 5 are relatively positioned horizontally by positioning pins 5a (FIG. 3) which are embedded in the support block 2 and the tops of legs 5. The legs 5 extend downwardly out of the heating furnace 1 through holes 1a defined vertically through the furnace floor of the heating furnace 1. The lower ends of the legs 5 are supported by respective vertical position adjusting mechanisms 6 mounted on a mount base 7.

Figure 4:
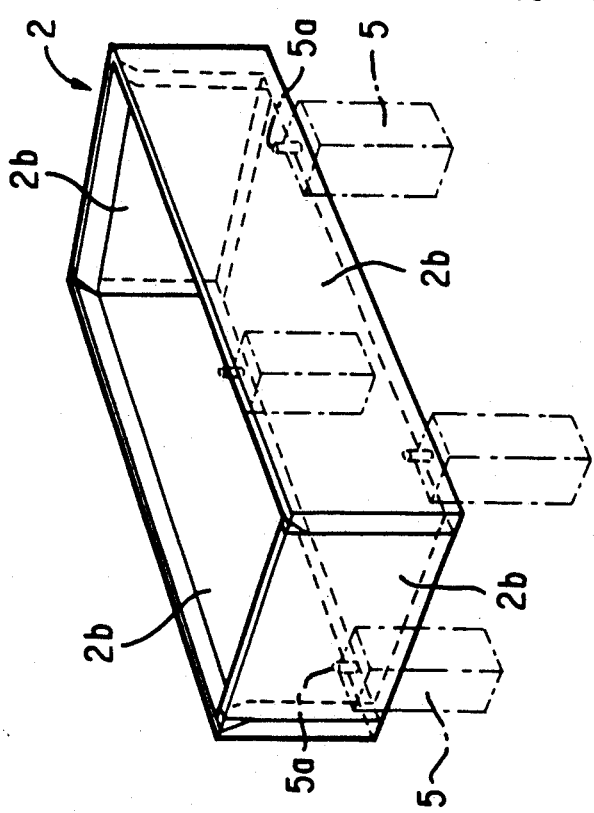
FIG. 4 is a perspective view of a support block of the air bed conveying system.

Each of the support blocks 2 is made of a quartz material, such as fused silica having a low thermal expansion coefficient. As shown in FIG. 4, the support block 2 comprises four fired panels 2b formed by a casting process. For assembly, the mating edges of the panels 2b are ground, and then the panels 2b are bonded together into a box configuration with the upper and lower open sides being bonded by an inorganic quartz adhesive. After bonding, the upper edges of the box are ground together, thus completing the support block 2 as illustrated in FIG. 4.

Figure 5:
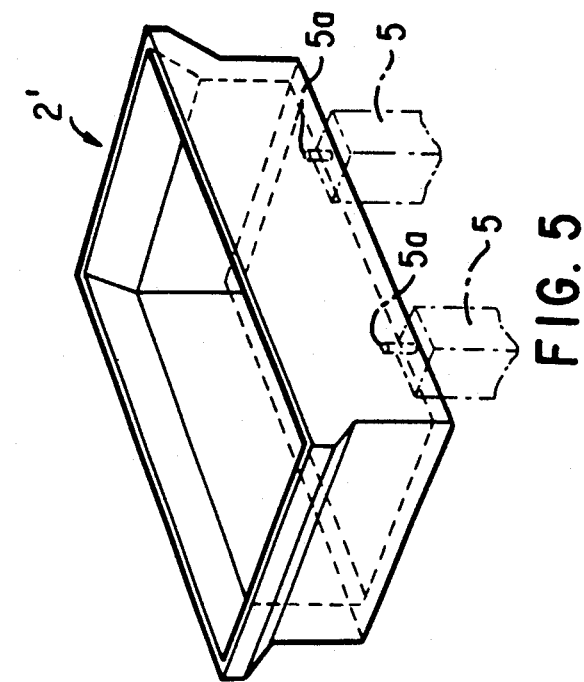
FIG. 5 is a perspective view of a support block according to a first modification.

According to a first modification shown in FIG. 5, a unitary box-shaped support block 2' with upper and lower open sides is formed by a casting process, and then its upper edges are ground together.

Figure 6:
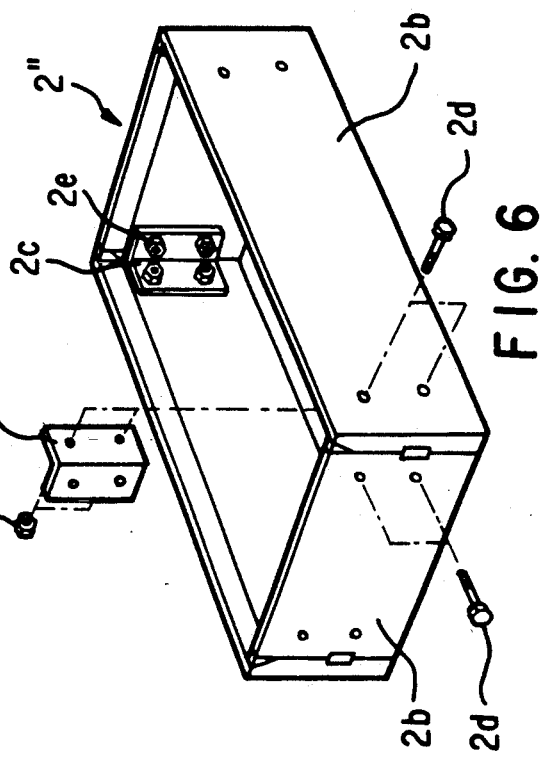
FIG. 6 is a perspective view of a support block according to a second modification.

FIG. 6 shows a second modification in which four panels 2b formed by a casting process are fastened together into a box shape by angles 2c, bolts 2d, and nuts 2e, and then the upper edges of the box are ground together, thereby finishing a support block 2".

Referring back to FIGS. 1 through 3, each of the air bed blocks 3 has an upper surface whose curvature is progressively greater downstream along the conveying direction C. The upper surface of the air bed block 3 is ground such that it is inclined downwardly to one side across the conveying direction C. A glass conveying chain 8 (FIG. 3) is disposed along the lower side edge of the upper surface of the air bed block 3 in spaced-apart relation to the side of the air bed block 3. The glass conveying chain 8 is caused to move along the conveying direction C by a drive mechanism (not shown). The sheet glass G which is floated over the air bed blocks 3 by hot air ejected from the air ejection holes 3a is engaged at a side edge thereof by the glass conveying chain 8, and conveyed in the conveying direction C by the glass conveying chain 8. While being conveying down the air bed blocks 3 under a floating condition, the sheet glass G is bent or curved successively by the air bed blocks 3, the curvature of each sheet being progressively greater in the downward direction.

Figure 7:
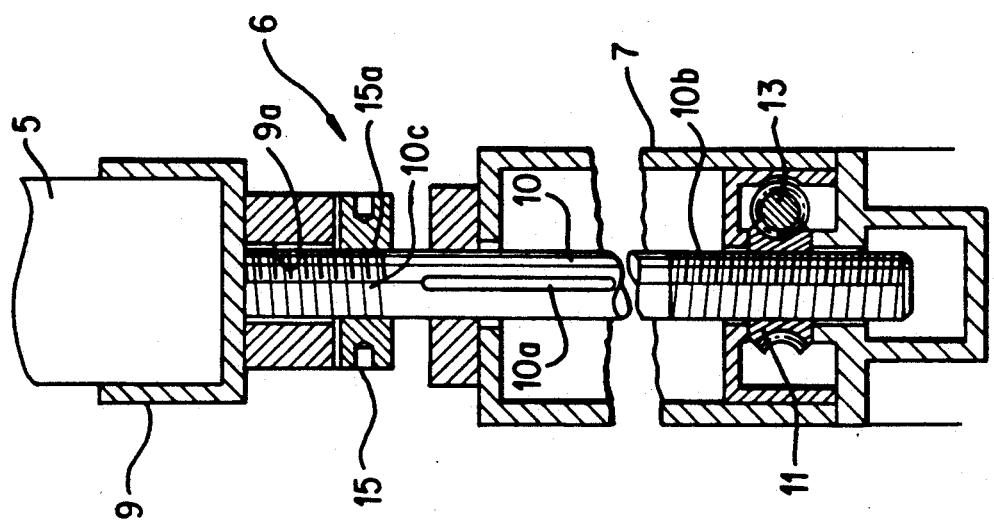
FIG. 7 is a cross-sectional view of a vertical position adjusting mechanism of the air bed conveying system.
Figure 10:
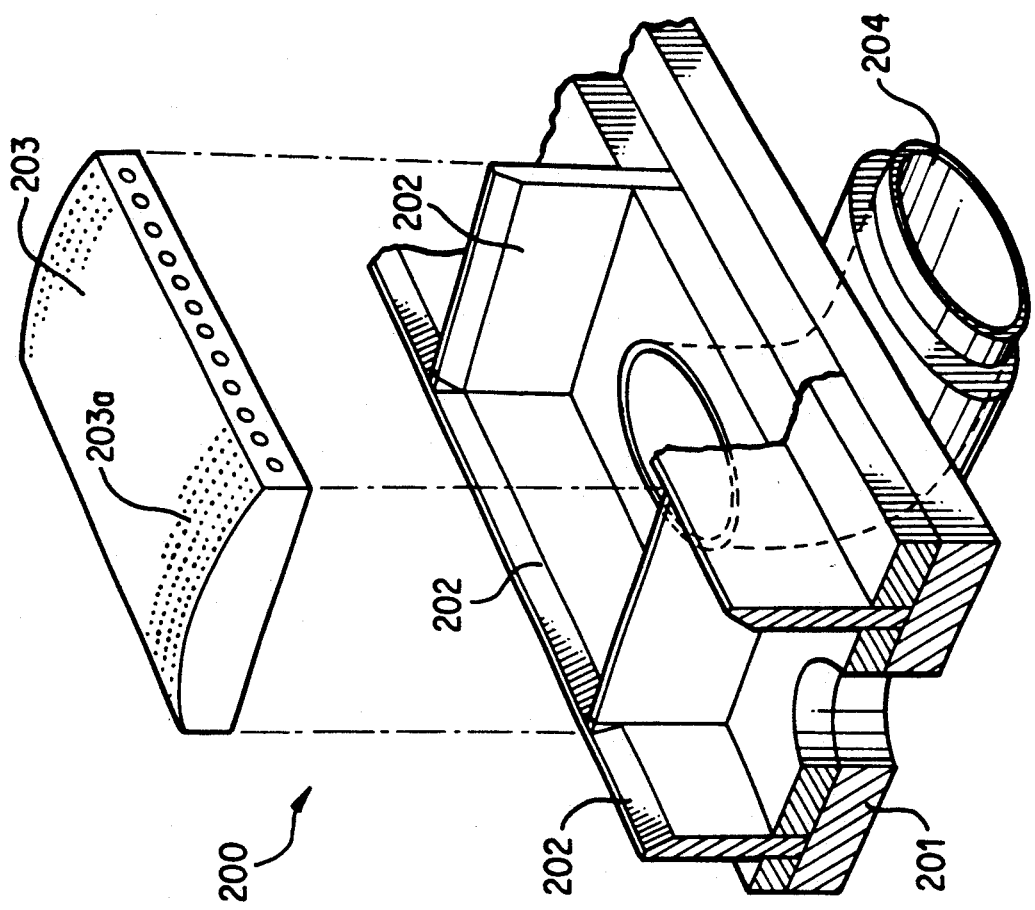
FIG. 10 is a perspective view of an air bed of a conventional air bed conveying system.

As shown in FIG. 7, each of the vertical position adjusting mechanisms 6 comprises a rod 10 supported on the mount base 7, and a receiver 9 attached to the upper end of the rod 10 and supporting the leg 5. The rod 10 has a vertical key 10a on an intermediate portion which engages in a vertical slot (not shown) in the mount base 7 for thereby preventing the rod 10 from rotating about its own axis. The rod 10 also has threads 10b on its lower end which are held in mesh with a worm wheel 11 that is rotated by a worm 13 which is in turn rotated by a handle 12 shown in FIGS. 1 through 3. The rod 10 further has threads 10c on its upper end. To assemble the receiver 9 on the rod 10, an adjusting nut 15 with inner threads 15a is first threaded over the threads 10c, and then the receiver 9 is mounted on the threads 10c above the adjusting nut 15, the threads 10c being received in an unthreaded central loose hole 9a in the receiver 9.

When the handle 12 is turned, the worm 13 and the worm wheel 11 are rotated, causing the rod 10 to move vertically while being prevented from rotating about its own axis. As a result, the leg 5 is vertically moved through the receiver 9. The handle 12 is not associated with each of the vertical position adjusting mechanisms 6, but with two of the vertical position adjusting mechanisms 6, i.e., left and right vertical position adjusting mechanisms 6 (FIG. 3). The transmission of turning power between the left and right vertical position adjusting mechanisms 6 is controlled by a clutch 14 that can be engaged and disengaged as desired. The adjusting nut 15 serves to adjust the vertical position of the leg 5 when the leg 5 is mounted on each of the vertical position adjusting mechanisms 6, independently of the other vertical position adjusting mechanisms 6.

When one of the handles 12 is turned with the clutch 14 engaged between the associated left and right vertical position adjusting mechanisms 6, the front or rear side of the support block 2 which corresponds to the handle 12 is vertically moved. When the handle 12 is turned with the clutch 14 disengaged, only one corner of the support block 2 which is positioned above the handle 12, is vertically moved. The above operations are suitably combined together with respect to the support blocks 2, so that the upper surfaces of the air bed blocks 3 are aligned successively with each other. One air bed block 3, one support block 2 coacting with the air bed block 3, one duct 4 coupled to the support block 2, four legs 5 supporting the support block 2, and two vertical position adjusting mechanisms 6 associated with the legs 5 jointly constitute a single air bed unit 51. The air bed conveying system 50 comprises a series of such air bed units 51 and the glass conveying chain 8.

Since the upper edges of the box-shaped support block 2 on which the air bed block 3 is placed are ground together, these upper edges lie flush with each other, and hence the air bed block 3 is sufficiently hermetically placed on the support block 2. Since the vertical position of the support block 2 can be adjusted by the vertical position adjusting mechanisms 6, the vertical positions of adjacent air bed blocks 3 can well be aligned with each other. As a result, the sheet glass G can be conveyed while it is being well floated.

Figure 8:
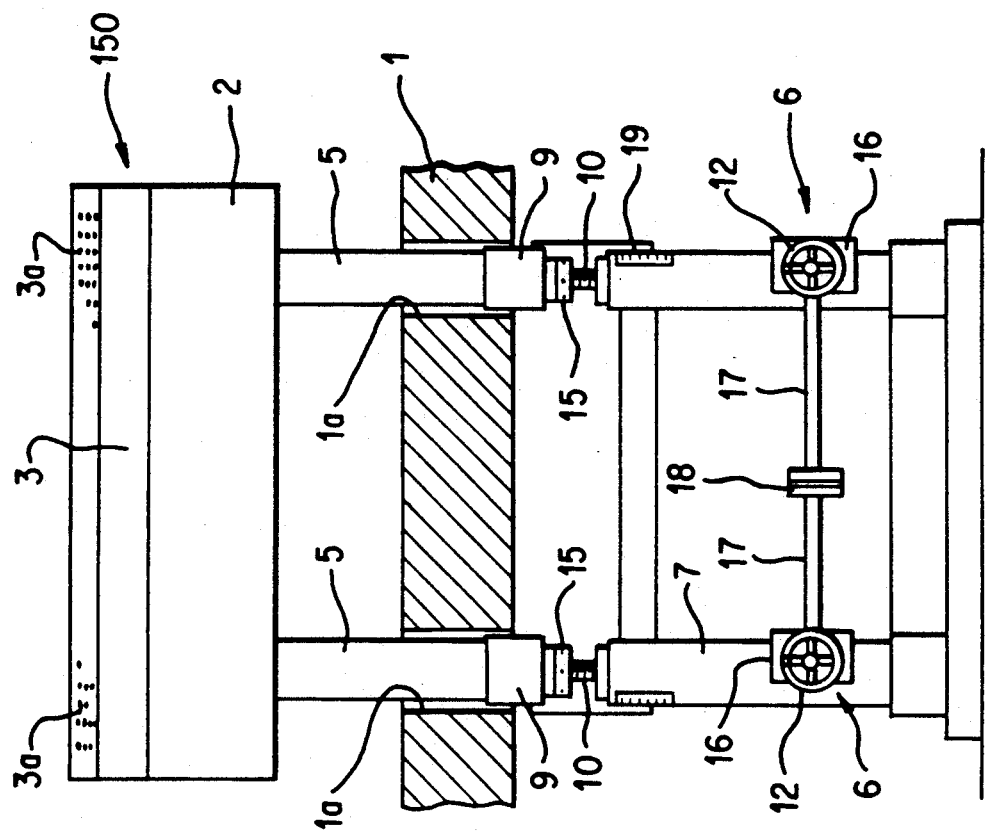
FIG. 8 is a front elevational view of a vertical position adjusting mechanism according to a second embodiment of the present invention.
Figure 9:
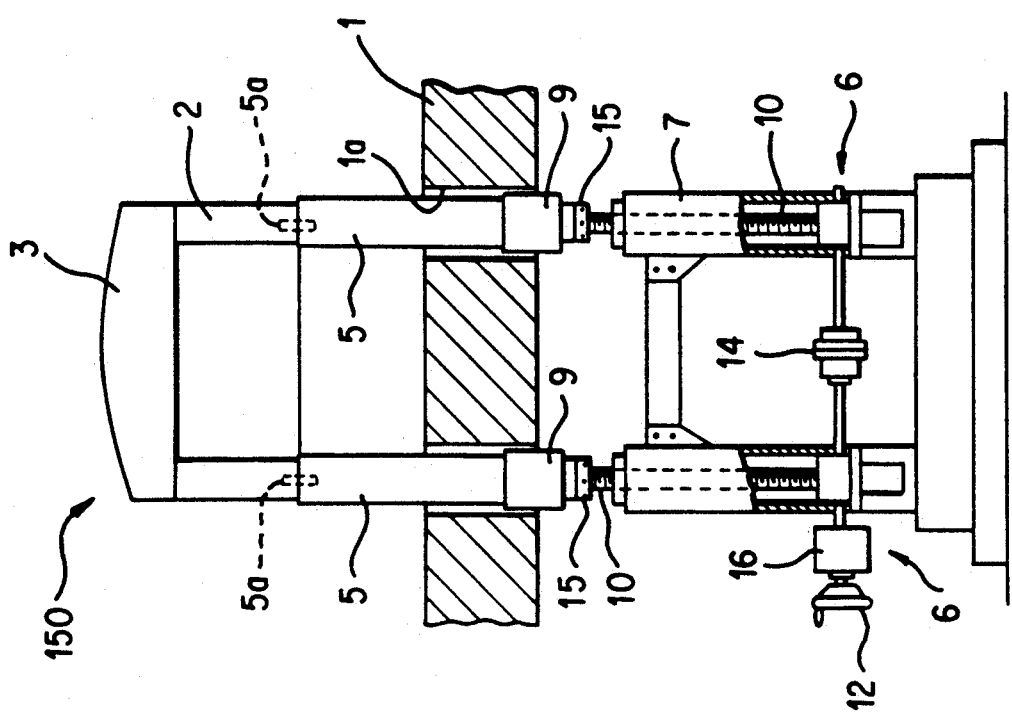
FIG. 9 is a side elevational view of the vertical position adjusting mechanism shown in FIG. 8.

FIGS. 8 and 9 show an air bed conveying system 150 according to a second embodiment of the present invention. Since the air bed conveying system 150 is basically the same in structure as the the air bed conveying system 50 according to the first embodiment, those parts of the air bed conveying system 150 which are identical to those of the air bed conveying system 50 are denoted by identical reference numerals, and will not be described in detail. In the air bed conveying system 150, an upstream handle 12 and a downstream handle 12 associated with each support block 2 are coupled to each other by two direction converting mechanisms 16, two rods 17 connected thereto, and a clutch 18 connected between the rods 17, the clutch 18 being selectively engageable and disengageable. When one of the handles 12 is turned with front and rear clutches 14 and the clutch 18 associated with the support block 2 being engaged, the four vertical position adjusting mechanisms 6 associated with the support block 2 are simultaneously actuated, so that the support block 2 can be vertically moved while maintaining its attitude. The mount base 7 is equipped with indicators 19 for indicating the vertical positions of the respective legs 5.

Although there have been described what are at present considered to be the preferred embodiments of the present invention, it will be understood that the invention may be embodied in other specific forms without departing from the essential characteristics thereof. The present embodiments are therefore to be considered in all aspects as illustrative, and not restrictive. The scope of the invention is indicated by the appended claims rather than by the foregoing description.

We claim:

1. An air bed conveying system comprising:
   a support block;
   a plurality of legs extending downwardly from respective corners of said support block;
   a mount base;
   an air bed block supported on said support block and having a plurality of air ejection holes defines therein, said support block and said air bed block jointly defining an air chamber for ejecting supplied air under pressure through said air ejection holes to float a workpiece, said support block being of an integral box-shaped configuration and made of a quartz material having a low thermal expansion coefficient;
   a plurality of vertical position adjusting mechanisms disposed underneath said support block, for adjusting said support block in vertical position, said vertical position adjusting mechanisms being associated respectively with said legs and interposed between said legs and said mount base; and
   a clutch by which said vertical position adjusting mechanisms are operatively connected to each other.

2. An air bed conveying system for conveying sheet glass in a conveying direction while the sheet glass is being floated, in a heating furnace of a curved sheet glass manufacturing apparatus, said air bed conveying system comprising:
   a plurality of air block units for floating the sheet glass thereover, said air block units being arrayed along the conveying direction in the heating furnace; and
   means for conveying the floated sheet glass in said conveying direction;
   each of said air block units comprising:
      a support block having upper edges ground together and made of a quartz material having a low thermal expansion coefficient, said support block being of a substantially box-shaped configuration;
      an air bed block supported on said support block and having a plurality of air ejection holes defined therein, wherein said support block and said air bed bock jointly define an air chamber;
      a hot air supplying mechanism for supplying hot air under pressure into said air chamber to cause the hot air to be ejected under pressure through said air ejection holes in order to float the sheet glass over said air bed block; and
      vertical position adjusting means for adjusting the vertical position of said support block thereby to adjust the vertical position of said air bed block, wherein said vertical position adjusting means comprises four adjusting mechanism for adjusting the vertical positions of respective four corners of said support block, a first clutch mechanism for selectively connecting and disconnecting an upstream pair of said adjusting mechanisms with respect to said conveying direction, and a second clutch mechanism for selectively connecting and disconnecting a downstream pair of said adjusting mechanisms with respect to said conveying direction.

3. An air bed conveying system according to claim 2, further comprising a third clutch mechanism for selectively connecting and disconnecting one of said upstream pair of said adjusting mechanisms and one of said downstream pair of said adjusting mechanisms.

4. An air bed conveying system according to claim 2, wherein said air bed blocks of said air blocks units are shaped to curve said sheet glass while the sheet glass is being conveyed.

* * * * *